US007168144B1

(12) United States Patent
Haelle

(10) Patent No.: US 7,168,144 B1
(45) Date of Patent: Jan. 30, 2007

(54) ALUMINUM WINDOW FRAME EXTRACTOR AND METHOD

(76) Inventor: Frank J. Haelle, P.O. Box 1462, Buckley, WA (US) 98321

( * ) Notice: Subject to any disclaimer, the term of this patent is extended or adjusted under 35 U.S.C. 154(b) by 0 days.

(21) Appl. No.: 11/443,588

(22) Filed: May 30, 2006

Related U.S. Application Data

(60) Provisional application No. 60/690,818, filed on Jun. 14, 2005.

(51) Int. Cl.
*B23P 19/04* (2006.01)

(52) U.S. Cl. ............................ 29/254; 29/275; 29/255

(58) Field of Classification Search .................. 29/254, 29/244, 270, 278, 255, 275
See application file for complete search history.

(56) References Cited

U.S. PATENT DOCUMENTS 3,791,012 A * 2/1974 Jenkin ......................... 29/254
4,307,635 A * 12/1981 Genova ....................... 81/463
4,335,493 A * 6/1982 Shivers et al. ................ 29/254

* cited by examiner

*Primary Examiner*—Lee D. Wilson
(74) *Attorney, Agent, or Firm*—Dean A. Craine

(57) ABSTRACT

A hand tool used to quickly and easily remove an aluminum window frame from a window casing that comprises a slide hammer assembly with an adjustable clamp attached to one end. The slide hammer assembly includes a handle that slides longitudinally over an elongated rod. Attached to the proximal end of the rod is a replaceable stop cap. Attached to the opposite distal end of the elongated rod is an adjustable clamp. During use, the elongated rod is perpendicularly aligned with a surface on the window frame. The adjustable clamp is then securely attached to the surface. The handle then slides downward over the elongated rod and against the stop cap to generate a pulling force to the member. Using the above described hand tool on all of the attached members, is a quick and easy method for removing an aluminum window.

4 Claims, 3 Drawing Sheets

ALUMINUM WINDOW FRAME EXTRACTOR AND METHOD

This is a utility patent application which claims benefit of U.S. provisional application No. 60/690,818 filed on Jun. 14, 2005.

BACKGROUND OF THE INVENTION

1. Field of the Invention

The present invention relates to hand tools, and more particularly to hand tools used to remove an aluminum window frame from a building.

2. Description of the Related Art

It is common to replace old aluminum windows with new vinyl windows that are more energy efficient. To replace an old aluminum window, the aluminum window frame must be removed from the window casing. The top and bottom members and the two side members on the aluminum window frame are attached to the window casing with nails or small screws. Typically, pry bars and hammers are used to separate the members from the casing. Unfortunately damage can occur to the interior and exterior wall surfaces and to the casing if great care is not used. The removal of the window frame from the window casing is a long process and it is a limiting factor on how many aluminum windows can be replaced during a work shift.

What is needed is a hand tool that allows workers to quickly and easily remove aluminum window frames from window casings without damaging the interior and exterior surfaces of the walls and casings.

SUMMARY OF THE INVENTION

The above stated objects along with other objects that may become apparent are met by the hand tool disclosed herein that selectively attaches to a window frame member and then applies a pulling force substantially perpendicular to the member to disconnect the member from the window casing. The tool is moved to selectively attach to every member attached to the window casing until the entire window frame is detached from the window casing.

The hand tool comprises a slide hammer assembly with an adjustable clamp attached to one end. The slide hammer assembly includes a handle that slides longitudinally over a rod attached at its distal end to the adjustable clamp. Attached to the proximal end of the rod is a replaceable stop cap. During use, the rod is perpendicularly aligned with a frame member on the window frame. The clamp is then adjusted to securely attach to the surface on the frame member. The handle is then forced downward over the rod and against the stop cap to generate a pulling force to the frame member.

Using the above described hand tool, a method for removing an aluminum window frame from a window casing is also provided.

DESCRIPTION OF THE PREFERRED EMBODIMENT(S)

Figure 1:
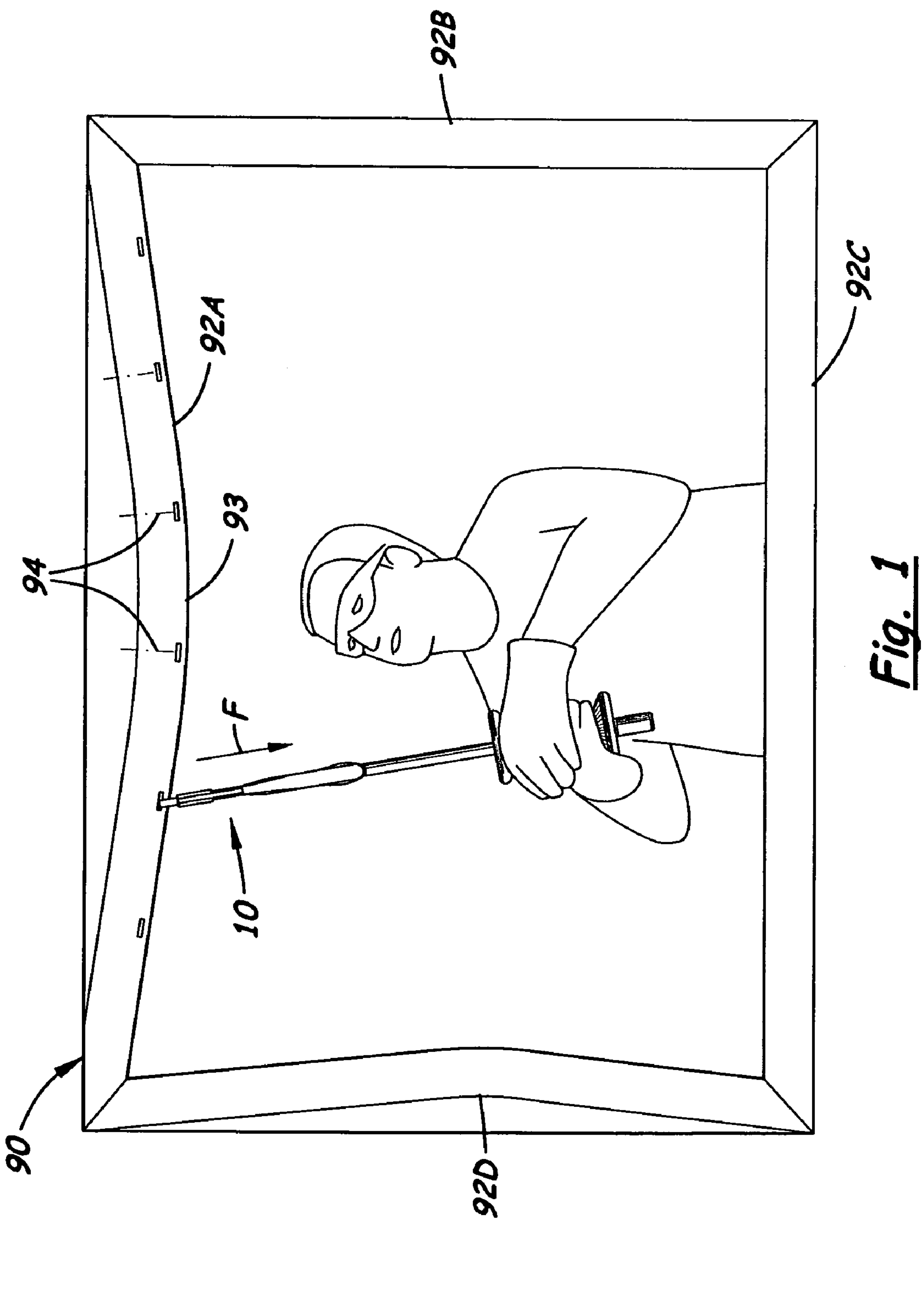
FIG. 1 is an illustration showing a worker using the hand tool disclosed herein to remove an aluminum window frame from a window casing.
Figure 2:
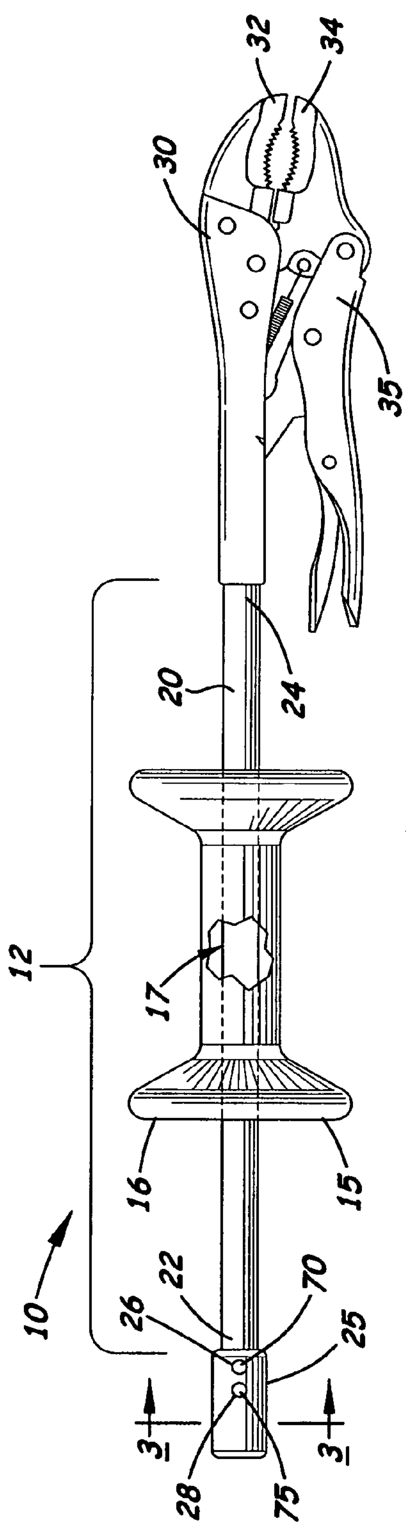
FIG. 2 is a side elevational view of the hand tool.
Figure 4:
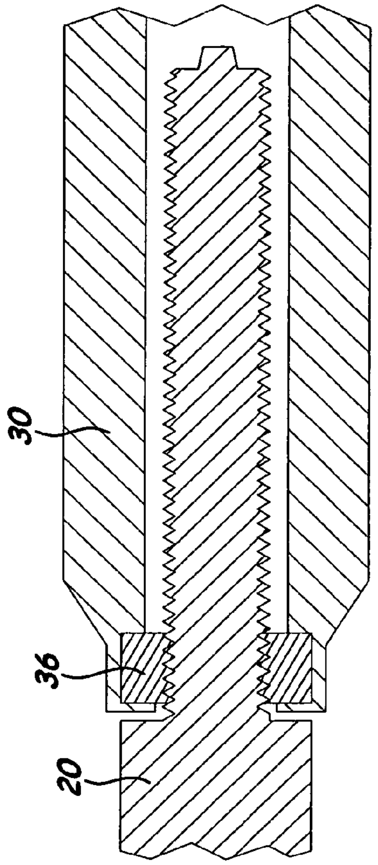
FIG. 4 is a sectional side elevational view of the distal end of the handle being attached to the adjustable clamp.
Figure 3:
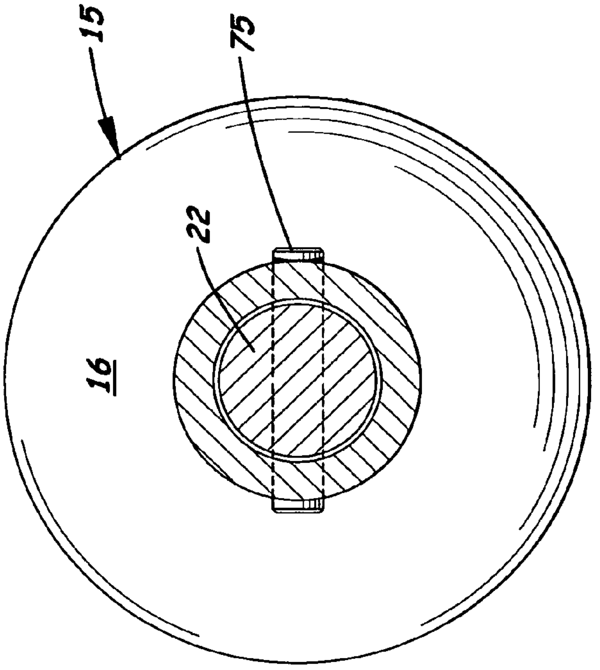
FIG. 3 is a sectional end view of the invention taken along line 3—3 in FIG. 2.
Figure 5:
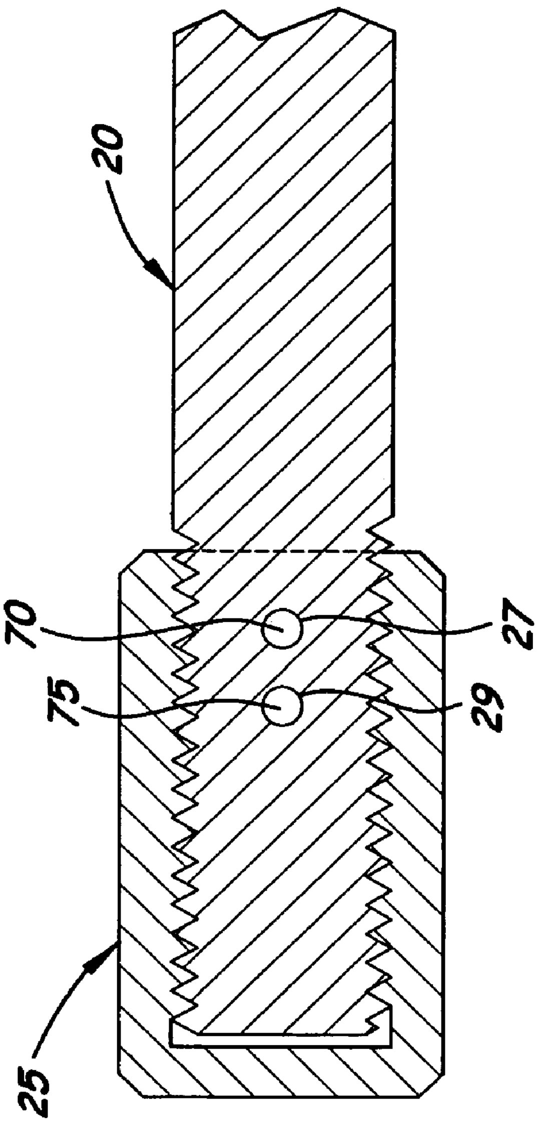
FIG. 5 is a sectional side elevational view of the elongated rod and the end cap.

There is shown in the accompanying FIGS. 1–5, a hand tool generally denoted as 10, designed to manually remove a window frame 91 from the widow casing 90 in a building. Using the hand tool 10, a pulling force (denoted f in FIG. 1) substantially perpendicular to a frame member 92A–D on the window frame 91 is created that overcomes the attachment force exerted by connectors 94 used to attach a frame member 92A–D to the window casing 90. During use, the hand tool 10 is selectively moved and connected to different frame members 92A–D until all of the frame members 92A–D have been detached from the window casing 90.

The hand tool 10 comprises a slide hammer assembly 12 with an adjustable clamp 30. The slide hammer assembly 12 includes a handle 15 that slides longitudinally over a rod 20. Attached to the proximal end 22 of the rod 20 is a replaceable stop cap 25. Attached to the opposite distal end 24 of the rod 20 is an adjustable clamp 30. During use, the rod 20 is perpendicularly aligned with the outer surface 93 on the frame member 92A–D. The adjustable clamp 30 is then securely attached to the frame member 92A–D. The handle 15 is then manually slid quickly and forcefully downward over the rod 20 and against the stop cap 25 to generate a pulling force to the frame member 92A–D to overcome the attachment force by the connectors 94.

In the preferred embodiment, the handle 15 includes a lower anvil surface 16 and a longitudinally aligned passageway 17. The passageway 17 is complimentary in shape with the rod 20 so that the handle 15 slides freely over the rod 20. In the preferred embodiment, the rod 20 and passageway 17 are circular in cross-section and the handle 15 is made of steel and weighs approximately 8 lbs. The anvil surface 16 is flat and perpendicularly aligned with the passageway 17. In the preferred embodiment, the anvil surface 16 is approximately 3 inches in length and 1¼ inches in *diameter*.

The rod 20 is approximately 18 inches in length and ⅝ inches in diameter. Formed on the rod's distal end 24 are two transversely aligned pin bores 26, 28 designed to receive two replaceable steel pins 70, 75. The distal end of the rod 20 includes external threads 100. During assembly, a stop cap 25 is placed over the distal end 24 of the rod 20. Formed inside the stop cap 25 is a threaded passageway 102 designed to connect to the threads 100 on the rod 20. Also formed on the stop cap 25 are two pin bores 27, 29 that are aligned and registered with the two pin bores 26, 28, respectively on the rod 20. During use, the upper end of the stop cap 25 becomes mangled by the impact with the handle 15. The stop cap 25 is designed to be replaced by removing the two pins 70, 75 from the pair of pin bores 26, 28. and 27, 29. In the preferred embodiment, the stop cap 25 is circular in cross-section and slightly larger in diameter than the passageway 17. The stop cap 25 measures approximately 2½ inches in length, 1¼ inches in diameter and is made of steel. The pin bores 26, 28 and 27, 29 are approximately 3/16 inches in diameter extend through the stop cap and rod 20.

In the preferred embodiment, the adjustable clamp 30 includes two adjustable biased jaws 32, 34 with a threaded nut 36 attached to its handle 38. The nut 36 is fixed in the handle 38 so that when the handle 38 is rotated on the rod 20 the user may adjust the gap opening between the jaws 32, 34. During use, the clamp 30 is rotated on the rod 20 so that the opening between the jaws 32, 34 is slightly larger that the surface 93 on the frame member 92A–D. The clamp 30 includes a spring-loaded lever arm 35 that is then pulled downward to engage the jaws 32, 34 onto the surface 93. Clamp 30 operates similar to adjustable pliers sold under the trademark Vise Grip, incorporated herein. The amount of force exerted by the jaws 32, 34 may be adjusted by rotating the adjustable clamp 30 over the proximal end of the rod 20.

Using the above described hand tool 10, a method for removing aluminum windows is provided comprising the following steps:

a. electing an aluminum window frame extraction tool 10 comprising a slide hammer assembly 12 that includes an elongated rod 20 with a stop cap 25 attached at one end, and an adjustable clamp 30 attached to an end of said rod 20 opposite said stop cap 25, said adjustable clamp 30 capable of selectively attaching to a surface on a frame member 92A–D of a window frame 91;

b. attaching said clamp 30 to a frame member 92A–D on said window frame 91;

c. sliding said handle 15 along said rod 20 towards said adjustable clamp 30;

d. quickly sliding said handle 15 along said rod 20 until said handle 15 impacts said stop cap 25;

e. repeating step (d) until said frame member 92A–D is detached from said window frame; and, f. repeating steps (b)–(e) on all frame members 92A–D until the entire window frame 91 is detached from said window casing 90.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An aluminum window frame extraction tool, comprising:

a. a slide hammer assembly that includes an elongated rod with a proximal end and a distal end, an anvil that slides freely over said rod, and a stop cap attached at one end, said stop cap being held on said elongated rod by a removable pin; and, b. an adjustable clamp attached to said distal end of said rod, said adjustable clamp including two jaws capable of applying a gripping force to a surface on a window frame.

2. The extraction tool, as recited in claim 1, wherein said stop cap is removably attached to said elongated rod.

3. The extraction tool, as recited in claim 1, wherein said stop cap is threadingly connected to said elongated rod.

4. The extraction tool, as recited in claim 1, wherein said adjustable clamp is coupled to said elongated rod so that when said elongated rod is rotated, the force exerted by said jaws is adjusted.

* * * * *